United States Patent
Mneimneh et al.

(10) Patent No.: US 12,084,088 B2
(45) Date of Patent: Sep. 10, 2024

(54) PEDESTRIAN INTENT YIELDING

(71) Applicant: Waymo LLC, Mountain View, CA (US)

(72) Inventors: Maher Mneimneh, San Jose, CA (US); Anne Hobbs Dorsey, Palo Alto, CA (US); Qiaojing Yan, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 225 days.

(21) Appl. No.: 17/873,261

(22) Filed: Jul. 26, 2022

(65) Prior Publication Data

US 2023/0031375 A1 Feb. 2, 2023

Related U.S. Application Data

(60) Provisional application No. 63/227,013, filed on Jul. 29, 2021.

(51) Int. Cl.
*B60W 30/09* (2012.01)
*B60W 60/00* (2020.01)
*G06N 20/00* (2019.01)

(52) U.S. Cl.
CPC ..... *B60W 60/0027* (2020.02); *B60W 2520/06* (2013.01); *B60W 2520/10* (2013.01);
(Continued)

(58) Field of Classification Search
CPC ................ B60W 30/09; B60W 60/00; B60W 60/0027; B60W 50/00; B60W 2554/4029; G06N 20/00
See application file for complete search history.

(56) References Cited

U.S. PATENT DOCUMENTS 8,195,394 B1 6/2012 Zhu et al.
8,825,350 B1 9/2014 Robinson
(Continued)

FOREIGN PATENT DOCUMENTS

| CN | 108447305 | 8/2018 |
|---|---|---|
| DE | 102018104270 | 8/2019 |

OTHER PUBLICATIONS

Extended Search Report in European Appln. 22187843.2, dated Dec. 22, 2022, 8 pages.

*Primary Examiner* — Tan Q Nguyen
(74) *Attorney, Agent, or Firm* — Fish & Richardson P.C.

(57) ABSTRACT

Methods, systems, and apparatus, including computer programs encoded on a computer storage medium, that determine yield behavior for an autonomous vehicle. An agent that is in a vicinity of an autonomous vehicle can be identified. An obtained crossing intent prediction characterizes a predicted likelihood that the agent intends to cross a roadway during a future time period. First features of the agent and of the autonomous vehicle are obtained. An input that includes the first features and the crossing intent prediction is processed using a machine learning model to generate an intent yielding score that represents a likelihood that the autonomous vehicle should perform a yielding behavior due to the intent of the agent to cross the roadway. From at least the intent yielding score, an intent yield behavior signal is determined and indicates whether the autonomous vehicle should perform the yielding behavior prior to reaching the first crossing region.

20 Claims, 4 Drawing Sheets

(52) U.S. Cl.
CPC ..... *B60W 2552/05* (2020.02); *B60W 2552/45* (2020.02); *B60W 2554/4029* (2020.02); *B60W 2554/4042* (2020.02); *B60W 2554/4044* (2020.02); *B60W 2554/4045* (2020.02); *B60W 2554/802* (2020.02)

(56) References Cited

U.S. PATENT DOCUMENTS

| | | |
|---|---|---|
| 8,954,252 B1 | 2/2015 | Urmson et al. |
| 9,248,834 B1 | 2/2016 | Ferguson et al. |
| 9,440,647 B1 | 9/2016 | Sucan et al. |
| 10,338,591 B2 | 7/2019 | Baalke et al. |
| 10,854,079 B2 | 12/2020 | Aoude et al. |
| 10,955,846 B1 | 3/2021 | Silver et al. |
| 11,167,756 B2 | 11/2021 | Shalev-Shwartz et al. |
| 11,198,430 B1 | 12/2021 | Zhu et al. |
| 11,287,820 B1 | 3/2022 | Zhu et al. |
| 11,643,106 B2 * | 5/2023 | Blaiotta ................. G06N 3/006 701/301 |
| 2017/0200061 A1 * | 7/2017 | Julian ................. G06V 10/764 |
| 2017/0329332 A1 | 11/2017 | Pilarski et al. |
| 2020/0241545 A1 | 7/2020 | Anthony |
| 2021/0122373 A1 | 4/2021 | Dax |
| 2021/0182604 A1 * | 6/2021 | Anthony ............. G05D 1/0088 |
| 2022/0269836 A1 * | 8/2022 | Mukundan ...... B60W 60/00276 |

* cited by examiner

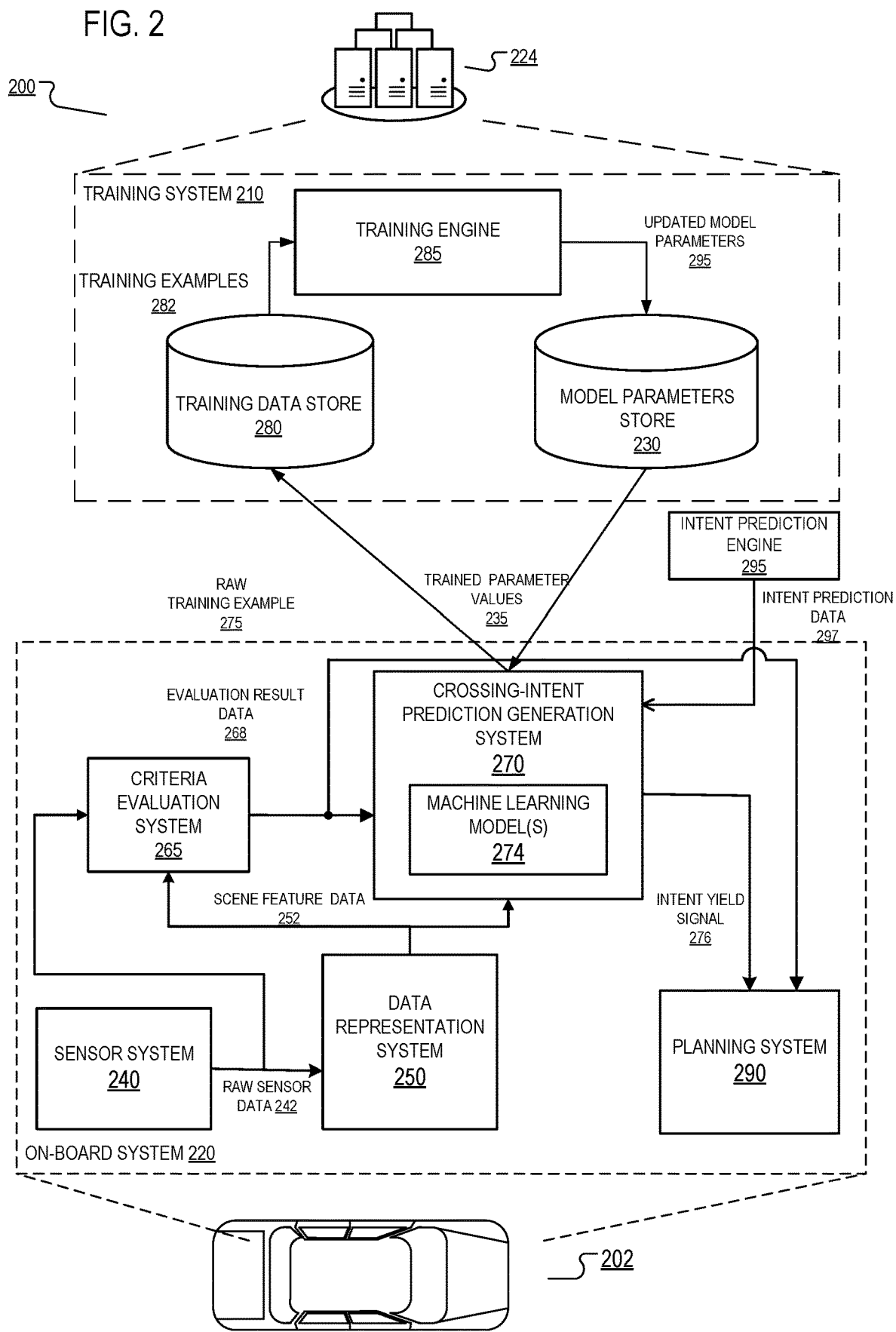

PEDESTRIAN INTENT YIELDING

CROSS-REFERENCE TO RELATED APPLICATION

This application claims the benefit of U.S. Provisional Application No. 63/227,013, filed Jul. 29, 2021, the contents of which are incorporated by reference herein.

TECHNICAL FIELD

This specification relates to autonomous vehicles.

Autonomous vehicles include self-driving cars, motorcycles, trucks, buses and similar vehicles. Autonomous vehicles use a variety of on-board sensors and computer systems to detect nearby objects and use such detections to make control and navigation decisions.

SUMMARY

This specification describes a system implemented as computer programs on one or more computers in one or more locations that determines candidate yield behavior for an autonomous vehicle in the vicinity of an agent, e.g., a pedestrian or a cyclist that is on or near a roadway. Yield behavior for an autonomous vehicle can be determined using a crossing intent prediction for an agent and a nominal crossing prediction for the agent.

Particular embodiments of the subject matter described in this specification can be implemented so as to realize one or more of the following advantages. The techniques described below can be used to allow an autonomous vehicle to mimic the behavior of a human driver whose driving behavior has been determined to be courteous. In addition, the described techniques allow an autonomous vehicle to mimic a courteous driver while avoiding maneuvers that could create unsafe driving conditions. Further, techniques described below can be used to enable an autonomous vehicle to create both intent yield signals and nominal yield signals, and to use one or both signals to create a candidate yield behavior. The autonomous vehicle can use the candidate yield behavior when planning its operation.

One aspect features identifying an agent that is in a vicinity of an autonomous vehicle navigating through an environment at a current time point. A crossing intent prediction is obtained and characterizes a predicted likelihood that the agent intends to cross a roadway at a first crossing region during a future time period that is after the current time point. First features of the agent and of the autonomous vehicle are obtained. An input that includes the first features and the crossing intent prediction is processed using a machine learning model that is configured to generate an intent yielding score that represents a likelihood that the autonomous vehicle should perform a yielding behavior prior to reaching the first crossing region due to the intent of the agent to cross the roadway. From at least the intent yielding score, an intent yield behavior signal is determined and indicates whether the autonomous vehicle should perform the yielding behavior prior to reaching the first crossing region.

One or more of the following features can be included. Second features of the agent and the autonomous vehicle can be obtained, and based on the second features, it can be determined that each of one or more criteria are satisfied. Processing the input using the machine learning model can include only processing the input using the machine learning model in response to determining that each of the one or more criteria are satisfied. The features of the agent can include at least one of distance from the roadway, speed, heading, mobility and the crossing intent prediction. The features of the autonomous vehicle can include at least one of speed, heading, distance from the agent, duration the autonomous vehicle has yielded, or whether the autonomous vehicle has right-of-way. A nominal yield behavior signal can be obtained and can indicate whether the autonomous vehicle should perform the yielding behavior prior to reaching the first crossing region due to a nominal behavior prediction for the agent that indicates whether the agent will cross the roadway in the future time period. A final yield behavior signal can be generated from at least the nominal yield behavior signal and the intent yield behavior signal. It can be determined that the final yield behavior signal indicates that the autonomous vehicle should yield, and a future trajectory of the autonomous vehicle can be modified to cause the autonomous vehicle to perform the yielding behavior. The machine learning model can be a classification model. The classification model can be a decision tree model. A criterion can include determining a speed of the autonomous vehicle, comparing the speed to a threshold value; and determining that the criterion is satisfied if the speed is below a threshold value. A criterion can include determining a type of roadway being traversed by the autonomous vehicle, determine whether the type of roadway is an unacceptable roadway type, and determining that the criterion is not satisfied if the type of roadway is an unacceptable roadway type.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a diagram of an example system for determining yield behavior for an autonomous vehicle in the vicinity of an agent.

Like reference numbers and designations in the various drawings indicate like elements.

DETAILED DESCRIPTION

This specification describes a system that determines candidate yield behavior for an autonomous vehicle in the vicinity of an agent, e.g., a pedestrian or a cyclist, that is on or near a roadway. The term "vicinity," as used in this specification, refers to the area of the environment that is within the sensing range of one or more sensors of the autonomous vehicle. Yield behavior for the autonomous vehicle can be determined using a crossing intent prediction for the agent and a nominal crossing prediction for the agent.

A crossing intent prediction differs from a nominal crossing prediction. While nominal crossing predictions relate to the expected behavior of an agent, and specifically whether the agent will cross or move within a roadway, a crossing intent prediction is a prediction of whether the agent intends or desires to cross the roadway if an opportunity exists. When a nominal crossing prediction indicates that an agent is likely to cross a roadway, safety dictates that an autonomous vehicle must take action to avoid the agent. Such yielding can be called "nominal yielding." When a crossing intent prediction indicates that an agent would like to cross a roadway, an autonomous vehicle can mimic the behavior of a courteous driver by yielding to the agent and thereby allowing the agent to cross, provided such yielding will not itself create an unsafe situation. Such yielding can be called "intent yielding."

However, there are situations in which attempts to drive courteously can potentially decrease overall road safety or efficiency. For example, if a vehicle has a green light when traveling straight through an intersection, that vehicle has clear right-of-way—that is, precedent to proceed—so intent yielding to a pedestrian might not be expected by other drivers, therefore potentially increasing the risk of adverse interactions with other vehicles. Similarly, attempts to intent yield when traveling at high speed or when traveling on a freeway are typically unexpected by other drivers and can increase the risk of adverse interactions with other vehicles. In another example, intent yielding that impedes traffic can result in inefficiency. In cases where an attempt to drive courteously can potentially decrease overall road safety or efficiency, intent yielding should typically not occur if only a crossing intent prediction (but no nominal prediction) exists.

Figure 1A:
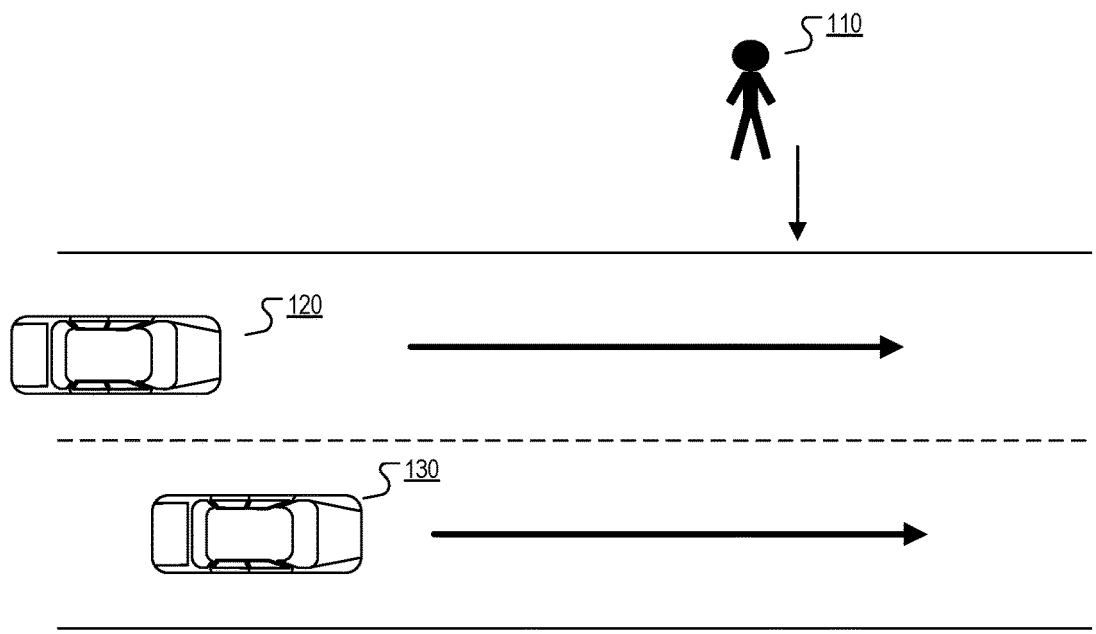
FIG. 1a is a diagram of vehicles traveling on a highway.

FIG. 1a is a diagram of vehicles traveling on a highway. In this illustration, a pedestrian 110 is nearing a highway as an autonomous vehicle 120 and a second vehicle 130 approach, both traveling in the same direction and at highway speeds (as illustrated by a thick line). In this situation, it is likely that the pedestrian will, at some point in the future, attempt to cross the highway once the roadway is clear. However, due to the circumstances, including the speed of travel and the type of roadway, the autonomous vehicle 120 would not yield purely out of courtesy to the pedestrian 110, as intent yielding could create unsafe driving circumstances for the autonomous vehicle or for another vehicle 130 in the vicinity. In this case, an intent yield would not be a candidate yield behavior. That is, the autonomous vehicle 120 should not yield if the pedestrian only desires to cross the road but will not cross the road unless an opportunity presents itself. However, as noted above, if a nominal crossing prediction indicates that the pedestrian 110 will cross the road imminently (such that there could be an interaction between the pedestrian 110 and the autonomous vehicle 120), the autonomous vehicle 120 could still yield in response to the nominal crossing prediction despite a determination that the autonomous vehicle 120 should not yield based on intent.

Figure 1B:
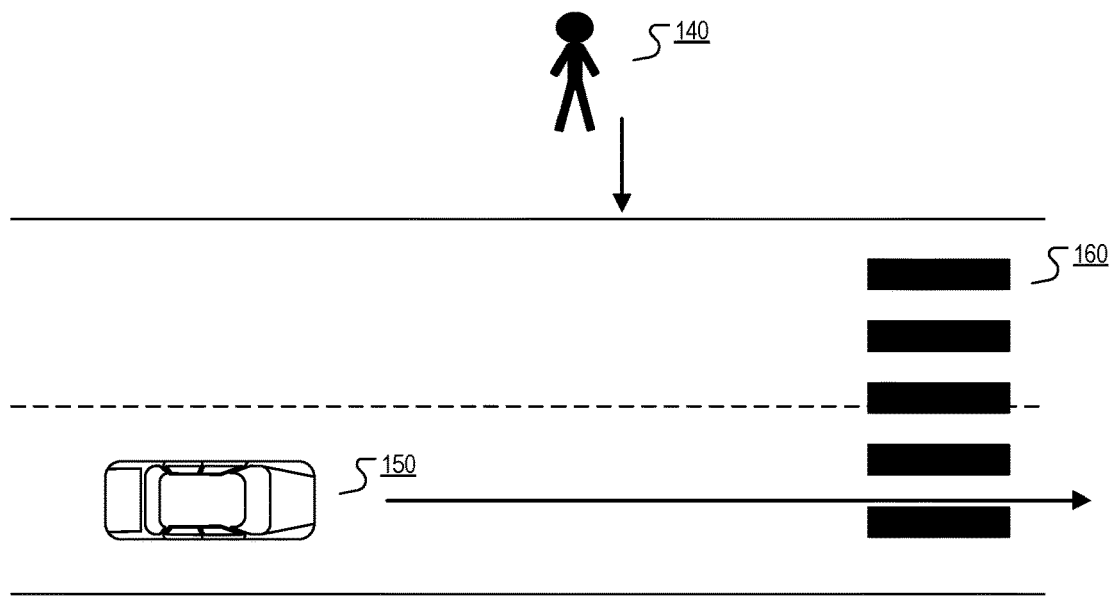
FIGS. 1b, 1c are diagrams of a vehicle traveling on a byway.

FIG. 1b is a diagram of a vehicle traveling on a byway. In this illustration, a pedestrian 140 is nearing a minor road such as a byway as an autonomous vehicle 150 approaches at byway speed (as illustrated by a thinner line). While there is a crosswalk 160 near where the pedestrian 140 is predicted to cross the road, the pedestrian's most likely trajectory is to cross outside the crosswalk 160. In this situation, while the pedestrian 140 does not have right-of-way (since the pedestrian is crossing outside the crosswalk 160), the autonomous vehicle 150 can still determine that yielding to the pedestrian 140 mimics the most likely behavior of a courteous driver, and the autonomous vehicle 150 can determine that it should yield based on intent, even if a nominal crossing prediction indicates that the pedestrian 140 will not imminently cross the byway.

Figure 1C:
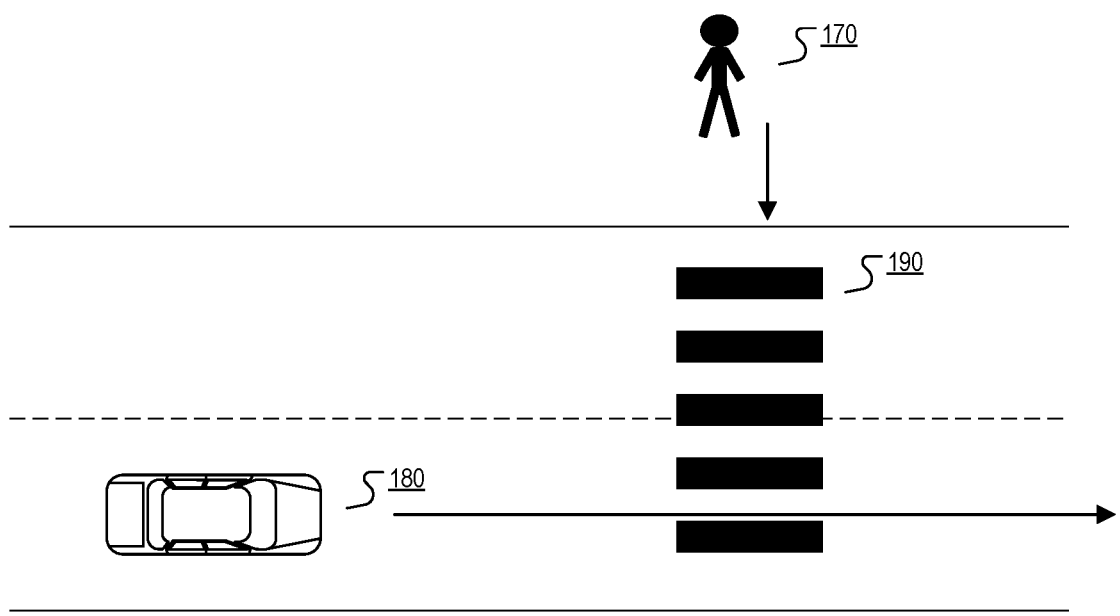

FIG. 1c is a diagram of a vehicle traveling on a byway. As in FIG. 1b, in this illustration, a pedestrian 170 is nearing a minor road such as a byway as an autonomous vehicle 180 approaches at byway speed (again as illustrated by a thinner line). In this example, since the pedestrian 170 is adjacent to a crosswalk 190, the pedestrian's most likely trajectory is to cross inside the crosswalk 190, and the pedestrian 170 does have right-of-way. In response, the autonomous vehicle 180 can determine that yielding to the pedestrian 170 is required by law and mimics the most likely behavior of a courteous driver. The autonomous vehicle 180 can determine that it should yield for multiple reasons, including based on intent, even if a nominal crossing prediction indicates that the pedestrian 170 will not imminently cross the byway.

FIG. 2 is a diagram of an example system for determining yield behavior for an autonomous vehicle in the vicinity of an agent. The system 200 can include an on-board system 220, a training system 210 and an intent prediction engine 295.

The on-board system 220 is physically located on-board a vehicle 202. Being on-board the vehicle 202 means that the on-board system 220 includes components that travel along with the vehicle 202, e.g., power supplies, computing hardware, and sensors. In some cases, the vehicle 202 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 202 can autonomously apply the brakes if a prediction indicates that a human driver is about to collide with another vehicle. As another example, the vehicle 202 can have an advanced driver assistance system (ADAS) that assists a human driver of the vehicle 202 in driving the vehicle 202 by detecting potentially unsafe situations and alerting the human driver or otherwise responding to the unsafe situation. As a particular example, the vehicle 202 can alert the driver of the vehicle 202 or take an autonomous driving action when an obstacle is detected, when the vehicle departs from a driving lane, or when an object is detected in a blind spot of the human driver. In another example, in response to determining that another agent might interact with the vehicle 202, the vehicle 202 can alert the driver or autonomously apply the brakes of the vehicle 202 or otherwise autonomously change the trajectory of the vehicle 202 to prevent an unwanted interaction between the vehicle 202 and the agent. The components of the on-board system 220 are described in more detail below.

Although the vehicle 202 in FIG. 2 is depicted as an automobile, and the examples in this document are described with reference to automobiles, in general the vehicle 202 can be any kind of vehicle. For example, besides an automobile, the vehicle 202 can be another kind of autonomous vehicle that travels along a roadway, e.g., a truck or a motorcycle. Moreover, the on-board system 220 can include components additional to those depicted in FIG. 2 (e.g., a collision detection system or a navigation system).

To enable the safe control of the autonomous vehicle 202, the on-board system 220 includes a sensor system 240 which enables the on-board system 220 to "see" the environment in the vicinity of the vehicle 202. More specifically, the sensor system 240 includes one or more sensors, some of which are configured to receive reflections of electromagnetic radiation from the environment in the vicinity of the vehicle 202. For example, the sensor system 240 can include one or more laser sensors (e.g., LIDAR laser sensors) that are configured to detect reflections of laser light. As another example, the sensor system 240 can include one or more radar sensors that are configured to detect reflections of radio waves. As another example, the sensor system 240 can include one or more camera sensors that are configured to detect reflections of visible light.

The sensor system 240 continually (i.e., at each of multiple time points) captures raw sensor data which can indicate the directions, intensities, and distances travelled by reflected radiation. For example, a sensor in the sensor system 240 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 240 can also include a combination of components that receive reflections of electromagnetic radiation, e.g., lidar systems that detect reflections of laser light, radar systems that detect reflections of radio waves, and camera systems that detect reflections of visible light.

The sensor subsystems 240 or other components of the vehicle 202 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 240 classify one or more groups of raw sensor measurements as being measures of respective other agents, the sensor subsystems 240 can compile the raw sensor measurements into a set of raw data 242, and send the raw data 242 to a data representation system 250.

The data representation system 250, also on-board the vehicle 202, receives the raw sensor data 242 from the sensor system 240 and additional data that characterizes the environment, i.e., roadway information that can include roadgraph data that identifies lanes and marked crossing zones within roadways in the environment and generates scene feature data 252 that includes features that characterize the agents and environment in the vicinity of the vehicle 202. The data representation system 250 can additionally receive precedence information that determines which agent or agents in the scene have right-of-way. Precedence information can include traffic laws (e.g., vehicles must yield to pedestrians in crosswalks) and conventions.

The scene feature data 252 can include a broad range of data such as the type of agent (motor vehicle, pedestrian, cyclist, etc.), the agent's location, speed, trajectory, and so on. For human agents, the scene feature data can include additional information, e.g., one or more of the agent's predicted role (e.g., construction worker, pedestrian, etc.), direction of gaze, or other characteristics.

In some implementations, the on-board system can augment the data available from the sensor system 240 by accessing data available in data repositories stored within the autonomous vehicle 202, or data repositories outside of, but coupled to, the autonomous vehicle, such as in a data center with the data available made to the autonomous vehicle over a cellular or other wireless network.

The data representation system 250 can provide the scene feature data 252 to a criteria evaluation system 265 on-board the vehicle 202.

The criteria evaluation system 265 can use the scene feature data 252 and raw sensor data 242 to determine whether heuristic criteria indicate that intent yielding is appropriate. Heuristic criteria can be expressed as rules (e.g., in "if-then-else" format), where each rule can optionally include a priority.

If the criteria evaluation system 265 determines that intent yielding is appropriate, the criteria evaluation system 265 can pass to an intent yielding prediction decision system 270 evaluation result data 268 indicating that intent yielding is appropriate. If the criteria evaluation system 265 determines that intent yielding is not appropriate, the criteria evaluation system 265 can pass to a planning system 290 evaluation result data 268 indicating that intent yielding is not appropriate. That is, if the evaluation result data 268 indicates that intent yielding is not appropriate, the system can bypass the intent yielding prediction decision system 270.

The intent yielding prediction decision system 270 can process input derived from the features using each of one or more machine learning models 274. Each machine learning model can generate intent a yield signal 276 for the agent that is in the vicinity of the autonomous vehicle 202. In some implementations, the intent yield signal 276 indicates whether an intent yield is a candidate behavior for the vehicle 202. In some implementations, the intent yield signal 276 includes a score that indicates the confidence in the determination as to whether an intent yield is a candidate behavior.

The one or more machine learning models 274 can be any appropriate type of machine learning model that can map a set of features to an intent yield signal, where an intent yield signal can include an indication that an intent yield is a candidate behavior for the vehicle 202. For example, a gradient boosting decision tree can be used. Examples of features used by one or more machine learning models can include one or more of (a) raw sensor data 242, (b) scene feature data 252, or (c) intent prediction data 297.

The one or more machine learning models 274 can receive intent prediction data 297 from an intent prediction engine 295. The intent prediction data 297 can include a single score that represents the likelihood that the agent has crossing intent. The intent prediction data can also include one or more predicted crossing trajectories, each with a determined likelihood that represents the likelihood that the agent intends to follow the crossing trajectory if an opportunity exists. The predicted crossing trajectories can also include indications of lateral and longitudinal uncertainty.

The intent prediction engine 295 can include a conventional machine learning model configured to produce intent predictions, such as a decision tree, a linear regression model, a support vector machine, a generalized linear model, a neural network, e.g., a multi-layer perceptron (MLP), etc. In addition, the intent prediction engine 295 can include a conventional machine learning model configured to produce trajectory predictions, such as a neural network.

The intent yield signal 276 can be delivered to a planning system 290. The planning system 290 can use the intent yield signal 276 to make fully-autonomous driving decisions, i.e., to update a planned trajectory for the vehicle 202. For example, the planning system 290 can generate a fully-autonomous plan to yield to a pedestrian if the intent yield signal 276 for that pedestrian indicates that an intent yield should occur. In this example, the planning system 290 can generate fully-autonomous control outputs to apply the brakes of the vehicle 202 causing the autonomous vehicle 202 to stop moving while the pedestrian crosses the roadway.

The onboard system 202 can also include an engine that creates nominal crossing predictions. Such a nominal crossing prediction engine can use conventional techniques, e.g., machine learning, heuristics or both, to create a nominal crossing prediction. The nominal crossing prediction engine can deliver a nominal crossing signal that includes the nominal crossing predictions to the planning system 290.

The fully-autonomous driving decisions generated by the planning system 290 can be implemented by a control system of the vehicle 202. For example, in response to receiving a fully-autonomous driving decision generated by the planning system 290 which indicates that the brakes of the vehicle should be applied, the control system may transmit an electronic signal to a braking control unit of the vehicle. In response to receiving the electronic signal, the braking control unit can mechanically apply the brakes of the vehicle.

The training system 210, which is generally located remotely from the on-board system 220, e.g., in a data center remote from the autonomous vehicle, generates trained parameter values 235 for the one or more machine learning models 274.

The training system 210 includes a training data store 280 that stores the training data used to train each of the machine learning models 274. The training data store 280 receives raw training examples from vehicles operating in the real world. For example, the training data store 280 can receive a raw training example 275 from the vehicle 202 and one or more other agents that are in communication with the training system 210. Each raw training example 275 can be processed by the training system 210 to generate a new training example used to train one or more machine learning models 274. In some implementations, the training examples can reflect the driving behavior of drivers who have been identified as courteous drivers, or who have been instructed to drive courteously.

The raw training examples 275 can include a model input for at least one machine learning model 274. The raw training examples 275 can also include outcome data characterizing the travel behavior of a vehicle, which can include whether the vehicle yielded to a given agent. The raw training examples 275 can further include outcome data characterizing the intent of the given agent, which can include whether the agent crossed the roadway. This outcome data can be used to generate a training example for one or more of the machine learning models 274.

The training data store 280 provides training examples 282 to a training engine 285, also housed in the training system 210. The training engine 285 uses the training examples 285 to update the model parameters of the machine learning model 274, and provides the updated model parameters 298 to the model parameters store 230. Once the parameter values of the model 274 have been fully trained, the training system 210 can send the trained parameter values 235 to the on-board system 220, e.g., through a wired or wireless connection.

The training system 210 is typically hosted within a data center 224, which can be a distributed computing system having hundreds or thousands of computers in one or more locations.

Figure 3:
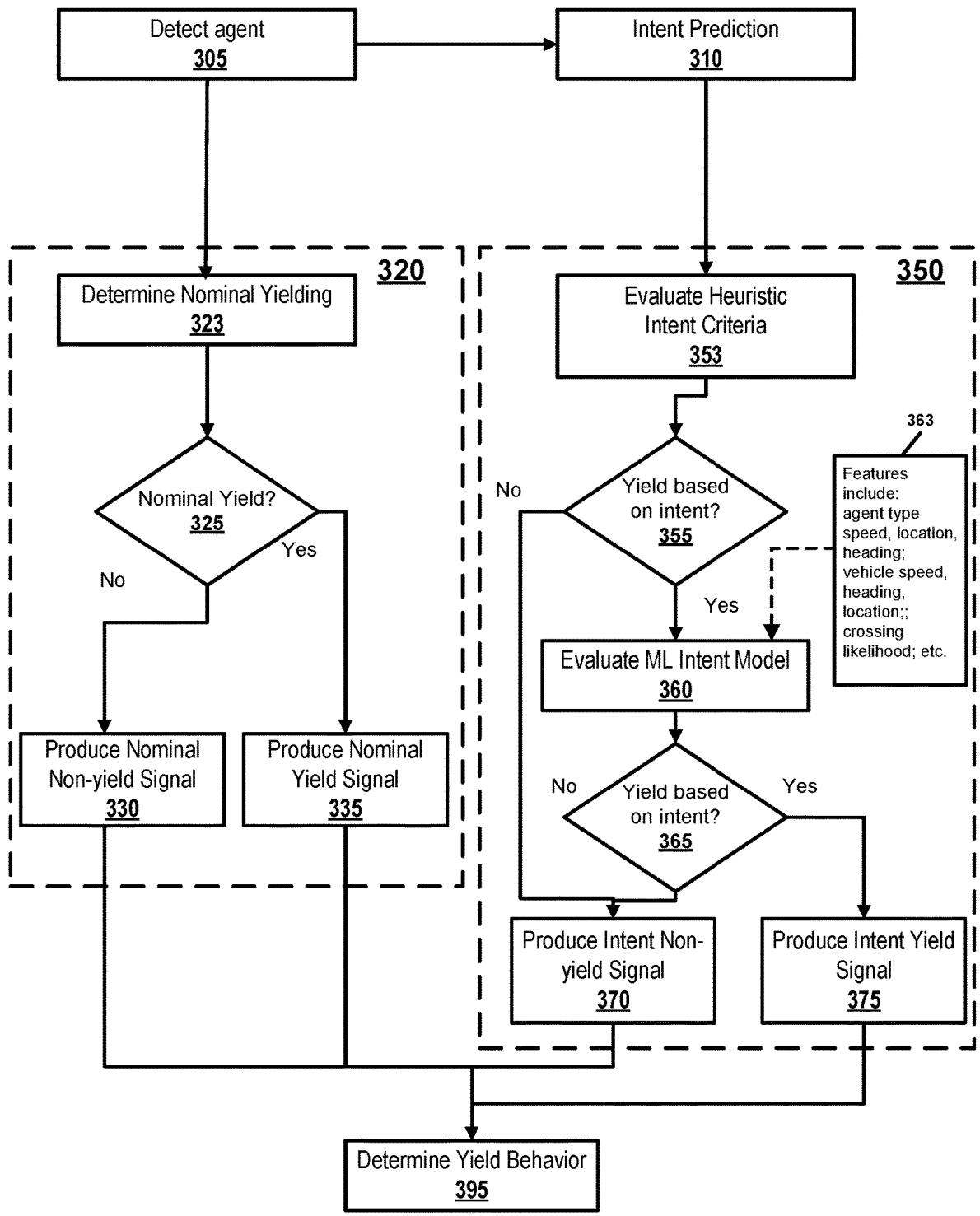
FIG. 3 is a flow diagram of an example process for determining yield behavior for an autonomous vehicle in the vicinity of an agent.

FIG. 3 is a flow diagram of an example process for determining yield behavior for an autonomous vehicle in the vicinity of an agent. For convenience, the process 300 will be described as being performed by a system of one or more computers located in one or more locations. For example, an on-board system, e.g., the on-board system 220 of FIG. 1, appropriately programmed in accordance with this specification, can perform the process 300.

In operation 305, the system detects an agent in the vicinity of the autonomous vehicle at a current time point, and further determines whether the agent is a vulnerable type Examples of vulnerable agent types can include pedestrians and bicyclists. The system can detect the agent and whether the agent is of a vulnerable type using conventional agent detection techniques applied to the sensor data obtained by the autonomous vehicle.

Upon determining that an agent is in the vicinity of an autonomous, the system can obtain, in operation 310, an intent prediction that characterizes a predicted likelihood that the agent intends to cross or move within a roadway at a first crossing region during a future time period after the current time point. As described above, a crossing intent prediction is a prediction of whether the agent intends to cross the roadway if an opportunity to cross exists and can indicate that the agent does intend to cross even if the nominal crossing prediction for the agent does not indicate that the agent will cross during the future time period. The prediction can be made, for example, using a conventional machine learning model configured to produce intent predictions. In some implementations, the intent prediction generated by the model is a single score that represents the likelihood that the agent has a crossing intent. In some implementations, the intent prediction generated by the model can be one or more predicted crossing trajectories, each with a determined likelihood that represents the likelihood that the agent intends to follow the crossing trajectory if an opportunity exists. The predicted crossing trajectories can also include indications of lateral and longitudinal uncertainty.

The system can then execute an intent determination subprocess 350 that determines whether to recommend intent yielding—that is, yielding in response to predicting that an agent would like to cross a roadway.

In operation 353 of intent determination subprocess 350, the system can evaluate heuristic intent criteria. Heuristic intent criteria can include any variety of criteria that determine, for example, whether the agent is likely to perceive the yielding as expected or whether an autonomous vehicle can yield safely given the current state of the vehicle, state of the agent, and the state of the surrounding roadway.

One category of criteria can relate to features of the agent. For example, a criterion can specify that an autonomous vehicle can yield only when the likelihood determined by the crossing intent prediction is above a contextually-determined threshold. In some implementations, the threshold can be determined heuristically or as a function of other measured and determined factors. For example, the threshold for intent yielding can be a function of the risk of intent yielding. In one such example, if the risk of intent yielding is determined to be low (e.g., if the risk of another vehicle colliding with the autonomous vehicle from behind is low), the threshold for intent yielding can be set to a low value. In some implementations, the threshold can be determined by a machine learning model configured to accept features of the scene and to produce a threshold value. Another example criterion can specify that an autonomous vehicle can intent yield only when an agent is within a configured distance of the roadway.

Another category of criteria can relate to features of the roadway. For example, a criterion can specify that an autonomous vehicle can intent yield only when a vehicle is not traveling on one or more unacceptable types of roadways, e.g., freeway. A similar criterion can specify that an autonomous vehicle can yield only when a vehicle is traveling on one or more acceptable type of roads, e.g., a byway.

A further category of criteria can relate to features of the autonomous vehicle. For example, a criterion can state the autonomous vehicle can intent yield only when the vehicle's speed is below a threshold. Criteria relating to the vehicle can also include a criterion associated with right-of-way. For example, a criterion can state that an autonomous vehicle can yield only when there is a nearby traffic light that governs the flow of traffic on the roadway that the agent intends to cross and the state of that nearby traffic light is in one of a set of acceptable states, e.g., states that do not assign right-of-way to the vehicle such as a solid red light or flashing red light.

One or more categories of criteria can also address situations where the autonomous vehicle has yielded in a prior time period and should cease yielding. Such criteria are only evaluated when the autonomous vehicle is currently yielding at the current time point, i.e., has previously determined to begin yielding and is still yielding at the current time point.

One category can include criteria relating to the agent. For example, a criterion could specify that a vehicle can only continue yielding if an agent begins to cross within a configured period after the autonomous vehicle has yielded. In another example, a criterion can specify that a vehicle can continue yielding only if the agent's predicted desire to cross, as indicated by an intent prediction (produced in operation 310), continues to satisfy a threshold.

Another category can include criteria relating to features of the environment. For example, if the state of a traffic light changes, the autonomous vehicle can cease to intent yield. (Nominal yielding, for example, if an agent began crossing the road, can continue.) In another example, if traffic circumstances change, and yielding would begin to impede traffic flow, intent yielding can cease.

In some implementations, the heuristic intent criteria can be satisfied only when all individual criteria that are evaluated are satisfied. For example, if an agent is in the vicinity of an autonomous vehicle that is traveling slowly along a byroad containing no traffic signals, and the crossing intent prediction suggests a high likelihood that the agent will cross the byroad, according to the example criteria listed above (i) the likelihood is above the threshold; (ii) the autonomous vehicle is traveling on a byway, not a freeway; (iii) there is no traffic light conferring right-of-way; and (iv) the speed is below the threshold. Since each individual criterion is satisfied in this example, the heuristic criteria are satisfied. Conversely, if the autonomous vehicle was traveling rapidly, criterion (iv) would not be satisfied, and therefore the heuristic criteria would not be satisfied, even if all other criteria are satisfied.

Based on the result of evaluating all heuristic evaluation criteria, in operation 355, the system determines how to proceed. If all heuristic intent criteria are satisfied, the system proceeds to operation 360. If at least one heuristic intent criterion is not satisfied, the system proceeds to operation 370 and produces an intent non-yield signal—that is, an indication that the vehicle should not yield based on agent intent.

In operation 360, the system can evaluate a machine learning model configured to produce a score associated with an intent yield recommendation. The model can be a classification model such as a decision tree, a generalized linear model, a neural network, e.g., a multi-layer perceptron (MLP), and so on. The model can receive as input features of the agent (e.g., distance from the roadway, speed, heading, age, pose and posture, mobility, and the intent prediction), features of the autonomous vehicle (e.g., speed, heading and right-of-way such as a green light) and features of the roadway (e.g., state of traffic lights, speed limit, roadway type, presence of speed bumps, etc.). In some implementations, the model can receive the intent prediction (obtained in operation 310) that characterizes a predicted likelihood that the agent intends to cross a roadway at a first crossing region during a future time period after the current time point The model can be trained using training data obtained from driving logs of vehicles operated by human drivers, e.g., drivers that have been trained to be courteous or drivers that have been classified as courteous, with each training example labeled as "yield" or "no yield" based on the operator's behavior.

The intent yield subprocess can evaluate the machine learning model by processing an input, including the features listed above, using the machine learning model to generate a score that indicates whether an intent yield signal should be produced.

In operation 365, if the score is determined not to satisfy a configured threshold, the system can produce, in operation 370, a non-yield signal—that is, an indication that the vehicle should not yield. If the score is determined to satisfy a configured threshold, the system can produce, in operation 375, a yield signal—that is, an indication that the vehicle should yield. The yield signal and non-yield signals reflect determinations that the autonomous vehicle should or should not yield, respectively.

While the illustration and description depict heuristic criteria evaluation (operation 353) being performed before the machine learning model evaluation 360, the evaluations can be performed in any order, including evaluating the criteria 353 and the machine learning model 360 at the same time. In all cases, the intent yield signal is produced only if both the machine learning model evaluation and the heuristic criteria evaluation produce yield signals.

In addition, the system can omit evaluation of the heuristic criteria 353 and produce an intent yield signal using only the score from evaluating the machine learning model 360, or vice versa.

In response to detecting an agent, the system can also execute a nominal crossing prediction subprocess 320 that can be a conventional technique for determining a nominal yield signal—that is, a signal that indicates that nominal yielding is a candidate yield behavior.

In operation 323, a nominal prediction model can determine whether an agent will cross the roadway after the current time point, for example, using a machine learning model configured to produce behavior predictions. If an agent is predicted to cross a roadway, autonomous vehicles in the vicinity will typically perform yielding behavior. Thus, in operation 325, if the nominal prediction model determines that a nominal yield is required, a nominal yield signal is produced 335; if the nominal prediction model determines 325 that a nominal yield is not required, a nominal non-yield signal is produced 330.

From the nominal and intent yield signals, the system can determine 395 a candidate yield behavior for the autonomous vehicle. For example, if the nominal signal specifies that a yield should occur, the candidate yield behavior can be to yield as yielding is that circumstance is preferred for safe operation. If the nominal signal does not specify that a yield should occur, then the system can use the intent yield signal to produce the candidate yield behavior.

However, the candidate yield behavior need not always be followed by the autonomous vehicle. For example, if the candidate yield behavior is determined to be unsafe or in conflict with other requirements, in some cases, the yield signal will not be followed. For example, if following the yield behavior could result in a tailgater collision from a vehicle that is approaching the autonomous vehicle rapidly, or failing to clear a restricted zone such as "no block" zone or railroad crossing, the candidate yield behavior can be overridden.

While this specification largely describes the intent of agents crossing or moving within a roadway, the techniques described herein can also be used in other cases. For example, an autonomous vehicle that is in the vicinity of a car pulling out of a driveway can use the techniques described herein to determine an intent prediction and a nominal prediction, where the intent prediction indicates whether the predicted intent of the car is to pull into the roadway and the nominal prediction indicates whether the car is predicted to pull into the roadway. As described above, to mimic the behavior of a courteous driver, the autonomous vehicle can yield based on the intent prediction, provided such a yield will not result in an unsafe situation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of determining yield behavior for an autonomous vehicle, the method comprising:
   identifying an agent that is in a vicinity of an autonomous vehicle navigating through an environment at a current time point;
   obtaining a crossing intent prediction that characterizes a predicted likelihood that the agent intends to cross a roadway at a first crossing region during a future time period that is after the current time point;
   obtaining first features of (i) the agent and (ii) the autonomous vehicle;
   processing an input comprising the first features and the crossing intent prediction using a machine learning model that is configured to generate an intent yielding score that represents a likelihood that the autonomous vehicle should perform a yielding behavior prior to reaching the first crossing region due to the intent of the agent to cross the roadway; and
   determining, from at least the intent yielding score, an intent yield behavior signal that indicates whether the autonomous vehicle should perform the yielding behavior prior to reaching the first crossing region.

2. The method of claim 1 further comprising:
   obtaining second features of the agent and the autonomous vehicle;
   determining, based on the second features, that each of one or more criteria are satisfied; and
   wherein processing the input using the machine learning model comprises only processing the input using the machine learning model in response to determining that each of the one or more criteria are satisfied.

3. The method of claim 1 wherein the features of the agent include at least one of distance from the roadway, speed, heading, mobility and the crossing intent prediction.

4. The method of claim 1 wherein the features of the autonomous vehicle include at least one of speed, heading, distance from the agent, duration the autonomous vehicle has yielded, or whether the autonomous vehicle has right-of-way.

5. The method of claim 1 further comprising:
obtaining a nominal yield behavior signal that indicates whether the autonomous vehicle should perform the yielding behavior prior to reaching the first crossing region due to a nominal behavior prediction for the agent that indicates whether the agent will cross the roadway in the future time period; and
generating a final yield behavior signal from at least the nominal yield behavior signal and the intent yield behavior signal.

6. The method of claim 5, further comprising:
determining that the final yield behavior signal indicates that the autonomous vehicle should yield; and
modifying a future trajectory of the autonomous vehicle to cause the autonomous vehicle to perform the yielding behavior.

7. The method of claim 1 where the machine learning model is a classification model.

8. The method of claim 7 where the classification model is a decision tree model.

9. The method of claim 2 where a criterion comprises:
determining a speed of the autonomous vehicle;
comparing the speed to a threshold value; and
determining that the criterion is satisfied if the speed is below a threshold value.

10. The method of claim 2 where a criterion comprises:
determining a type of roadway being traversed by the autonomous vehicle;
determine whether the type of roadway is an unacceptable roadway type; and
determining that the criterion is not satisfied if the type of roadway is an unacceptable roadway type.

11. A system comprising one or more computers and one or more storage devices storing instructions that when executed by the one or more computers cause the one or more computers to perform operations comprising:
identifying an agent that is in a vicinity of a autonomous vehicle navigating through an environment at a current time point;
obtaining a crossing intent prediction that characterizes a predicted likelihood that the agent intends to cross a roadway at a first crossing region during a future time period that is after the current time point;
obtaining first features of (i) the agent and (ii) the autonomous vehicle;
processing an input comprising the first features and the crossing intent prediction using a machine learning model that is configured to generate an intent yielding score that represents a likelihood that the autonomous vehicle should perform a yielding behavior prior to reaching the first crossing region due to the intent of the agent to cross the roadway; and
determining, from at least the intent yielding score, an intent yield behavior signal that indicates whether the autonomous vehicle should perform the yielding behavior prior to reaching the first crossing region.

12. The system of claim 11, the operations further comprising:
obtaining second features of the agent and the autonomous vehicle;
determining, based on the second features, that each of one or more criteria are satisfied; and
wherein processing the input using the machine learning model comprises only processing the input using the machine learning model in response to determining that each of the one or more criteria are satisfied.

13. The system of claim 11 wherein the features of the agent include at least one of distance from the roadway, speed, heading, mobility and the crossing intent prediction.

14. The system of claim 11 wherein the features of the autonomous vehicle include at least one of speed, heading, distance from the agent, duration the autonomous vehicle has yielded, or whether the autonomous vehicle has right-of-way.

15. The system of claim 11, the operations further comprising:
obtaining a nominal yield behavior signal that indicates whether the autonomous vehicle should perform the yielding behavior prior to reaching the first crossing region due to a nominal behavior prediction for the agent that indicates whether the agent will cross the roadway in the future time period; and
generating a final yield behavior signal from at least the nominal yield behavior signal and the intent yield behavior signal.

16. The system of claim 15, the operations further comprising:
determining that the final yield behavior signal indicates that the autonomous vehicle should yield; and
modifying a future trajectory of the autonomous vehicle to cause the autonomous vehicle to perform the yielding behavior.

17. The system of claim 11 where the machine learning model is a classification model.

18. The system of claim 12 where a criterion comprises:
determining a speed of the autonomous vehicle;
comparing the speed to a threshold value; and
determining that the criterion is satisfied if the speed is below a threshold value.

19. The system of claim 12 where a criterion comprises:
determining a type of roadway being traversed by the autonomous vehicle;
determine whether the type of roadway is an unacceptable roadway type; and
determining that the criterion is not satisfied if the type of roadway is an unacceptable roadway type.

20. One or more non-transitory computer-readable storage media storing instructions that when executed by one or more computers cause the one or more computers to perform operations comprising:
identifying an agent that is in a vicinity of a autonomous vehicle navigating through an environment at a current time point;
obtaining a crossing intent prediction that characterizes a predicted likelihood that the agent intends to cross a roadway at a first crossing region during a future time period that is after the current time point;
obtaining first features of (i) the agent and (ii) the autonomous vehicle;
processing an input comprising the first features and the crossing intent prediction using a machine learning model that is configured to generate an intent yielding score that represents a likelihood that the autonomous vehicle should perform a yielding behavior prior to reaching the first crossing region due to the intent of the agent to cross the roadway; and determining, from at least the intent yielding score, an intent yield behavior signal that indicates whether the autonomous vehicle should perform the yielding behavior prior to reaching the first crossing region.

* * * * *